Patented Apr. 30, 1946

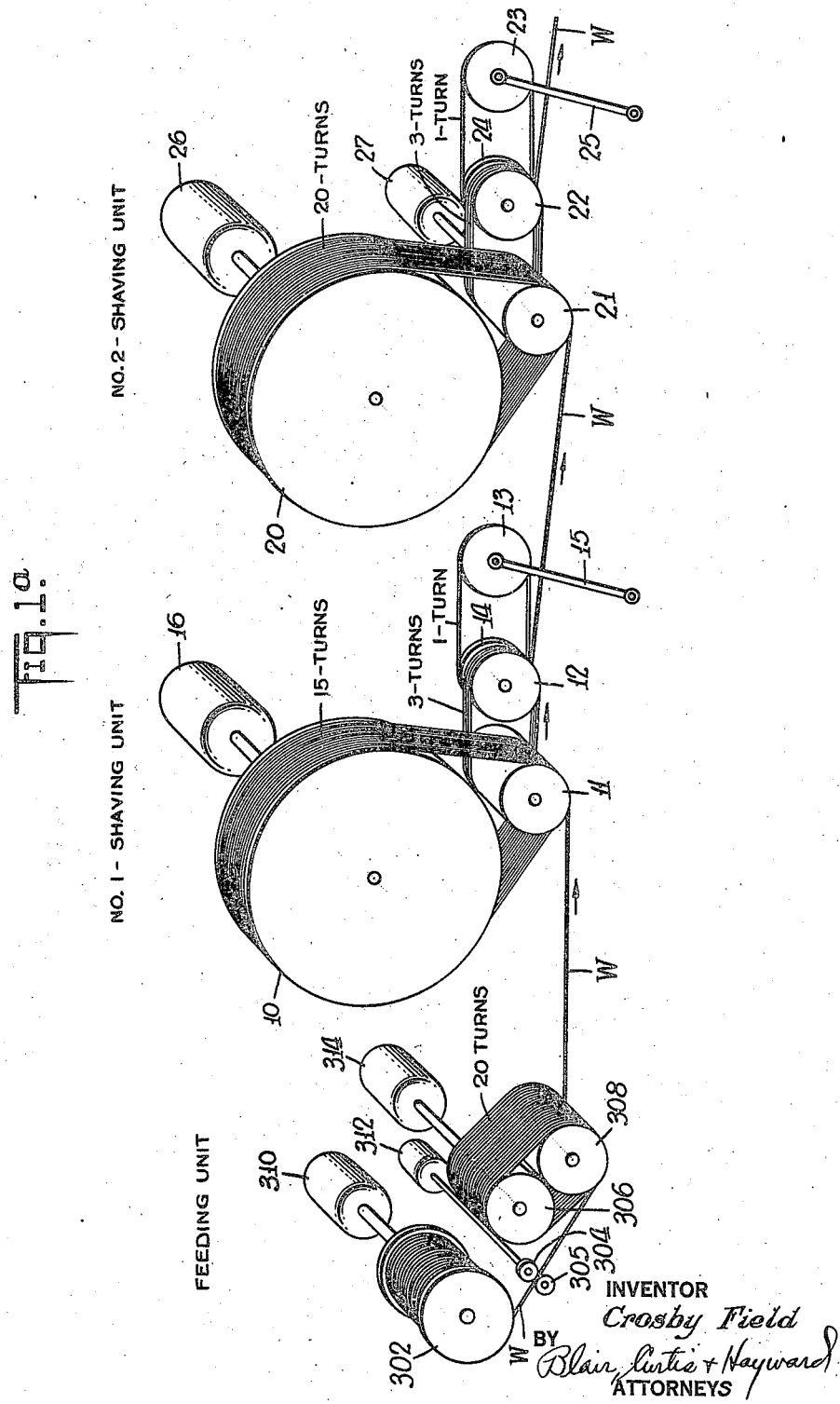

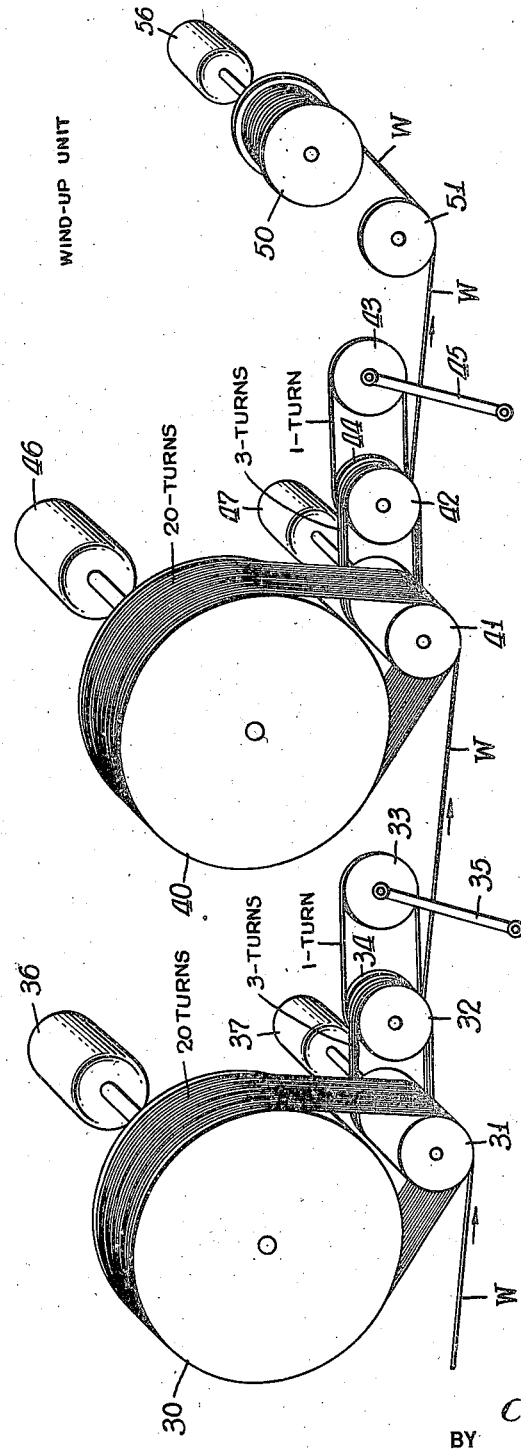

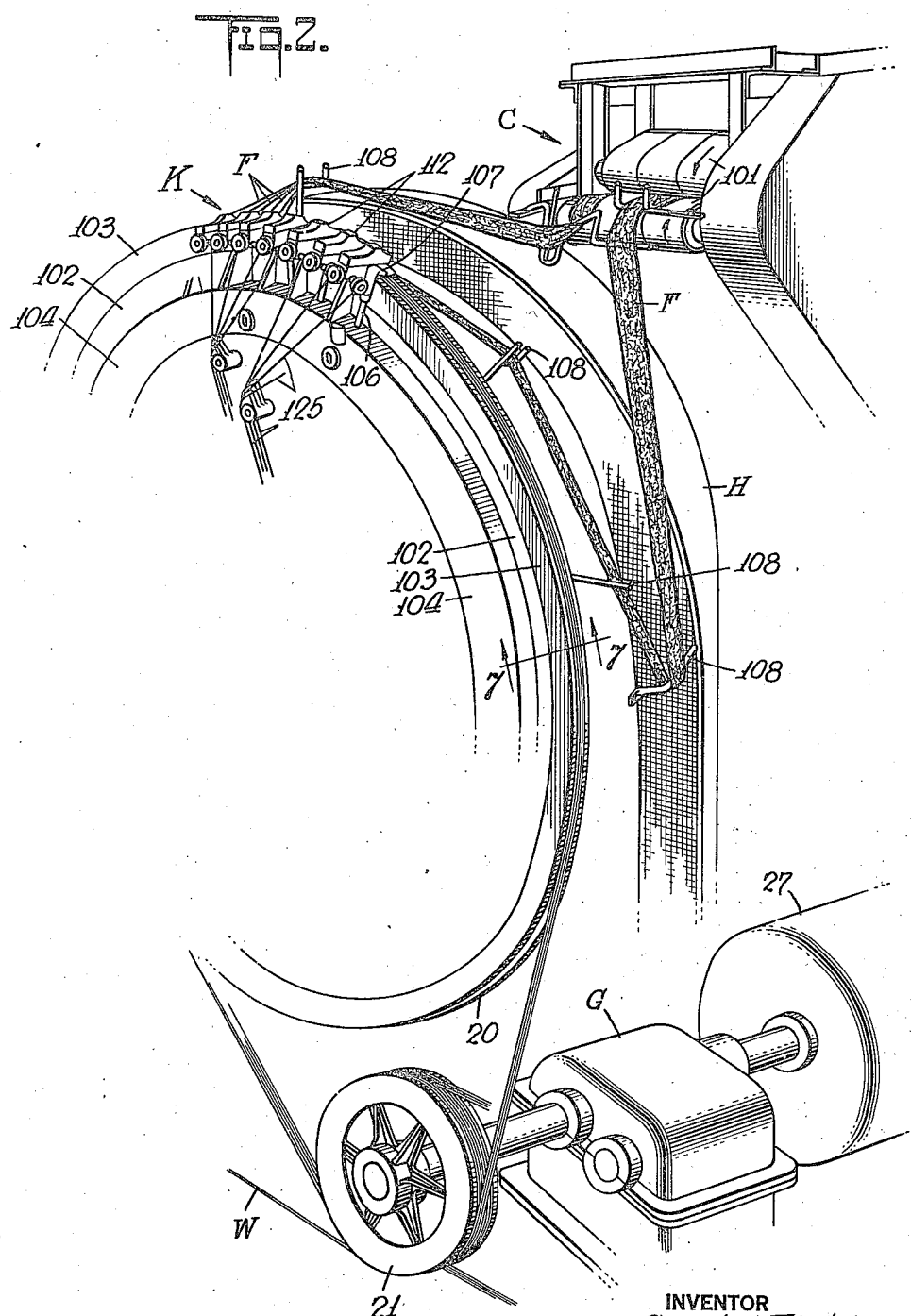

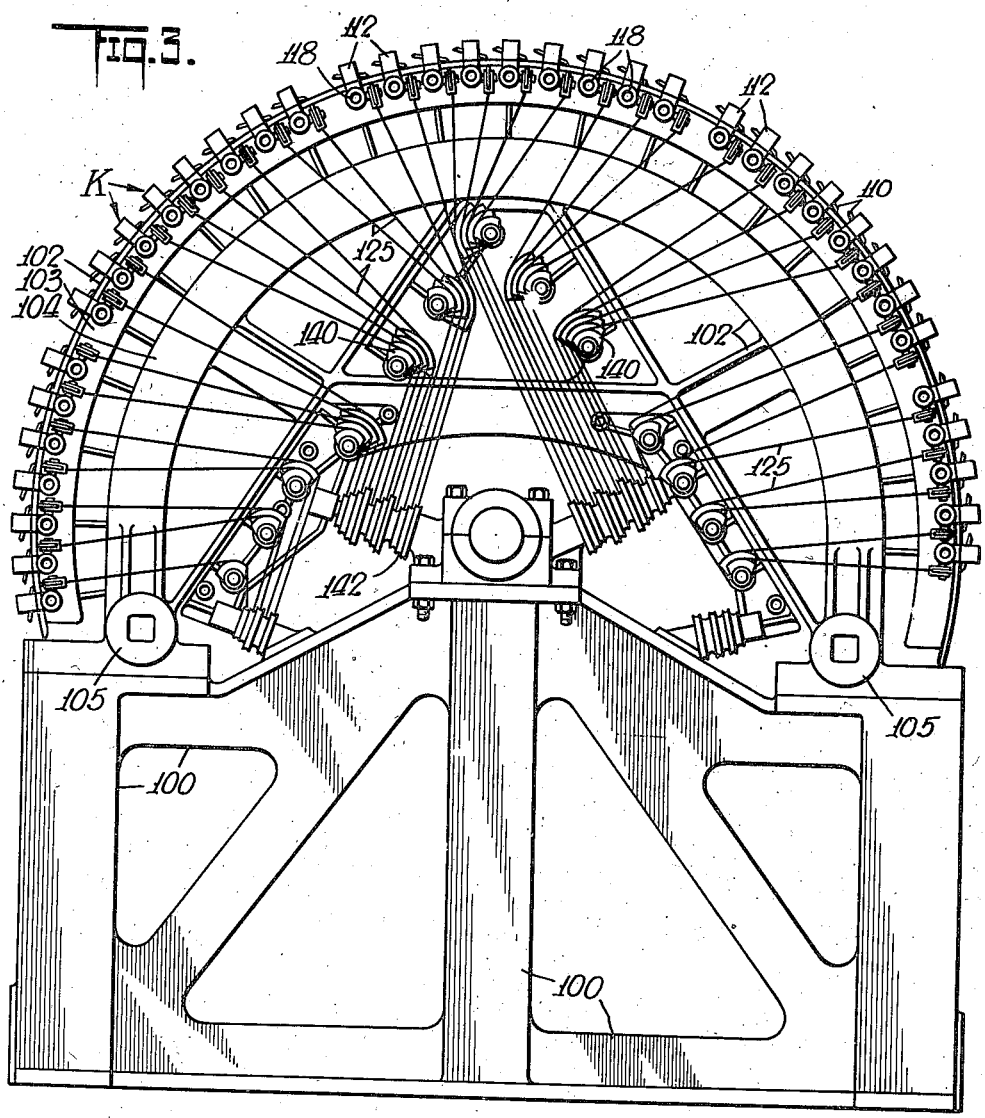

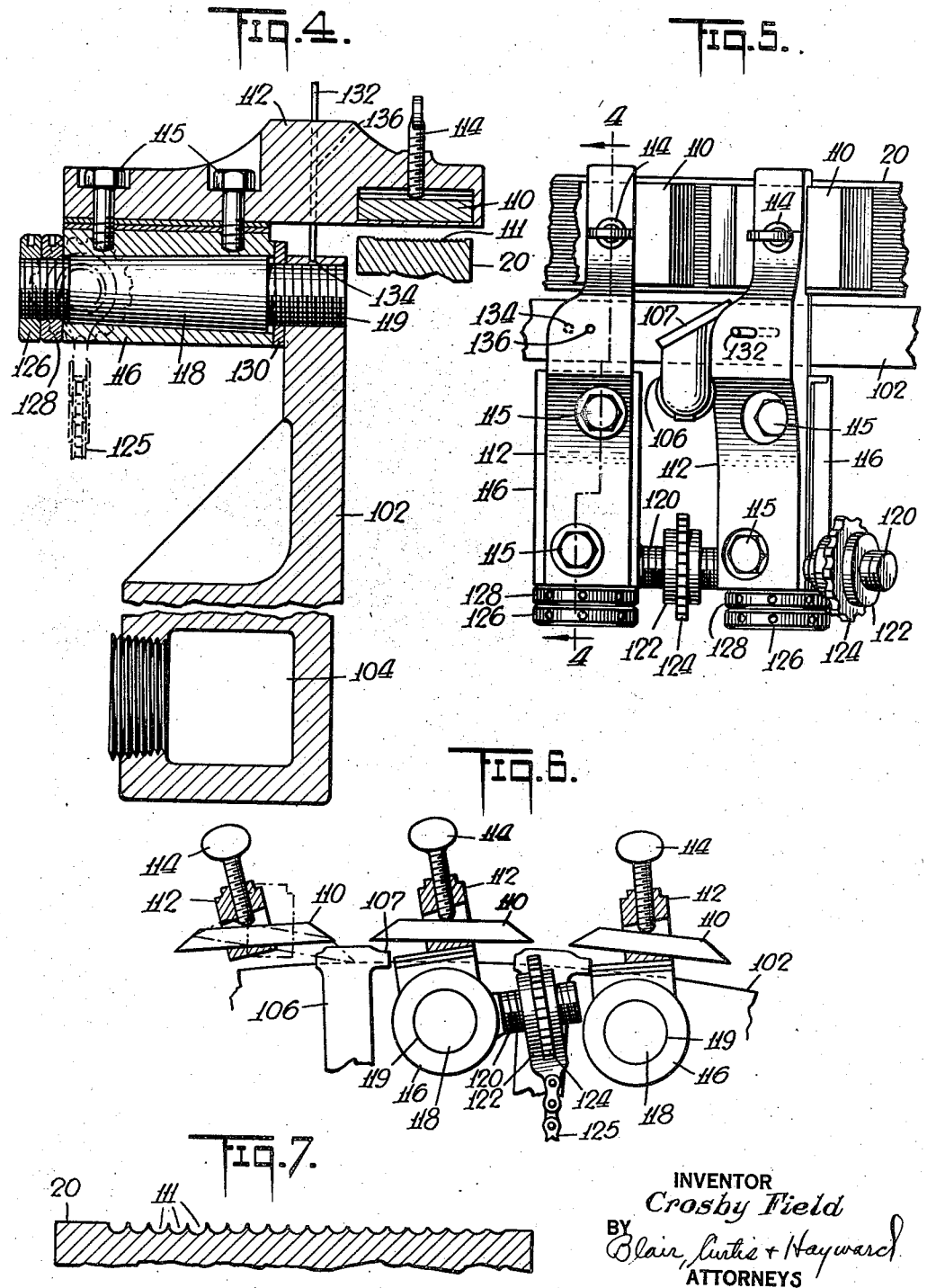

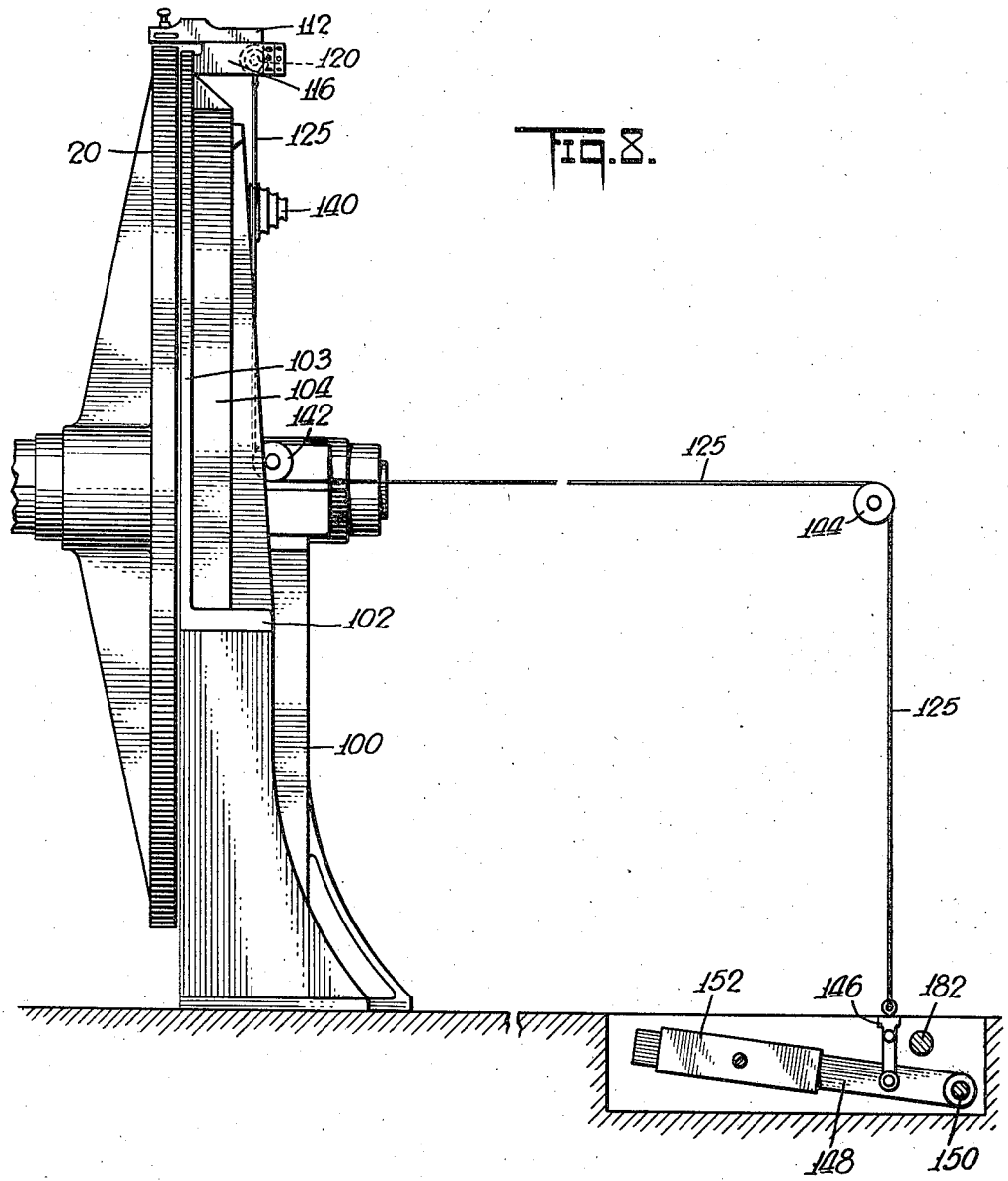

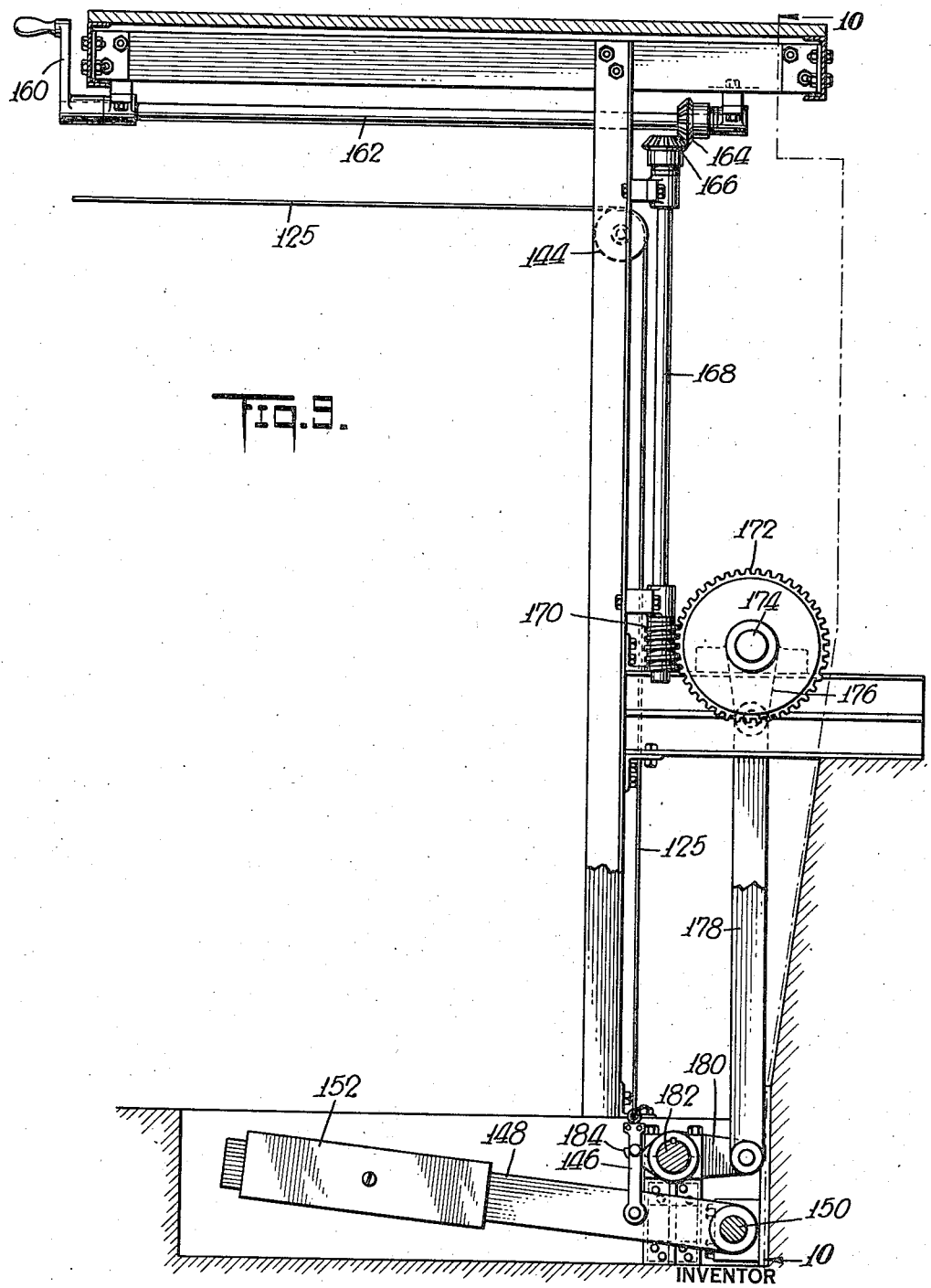

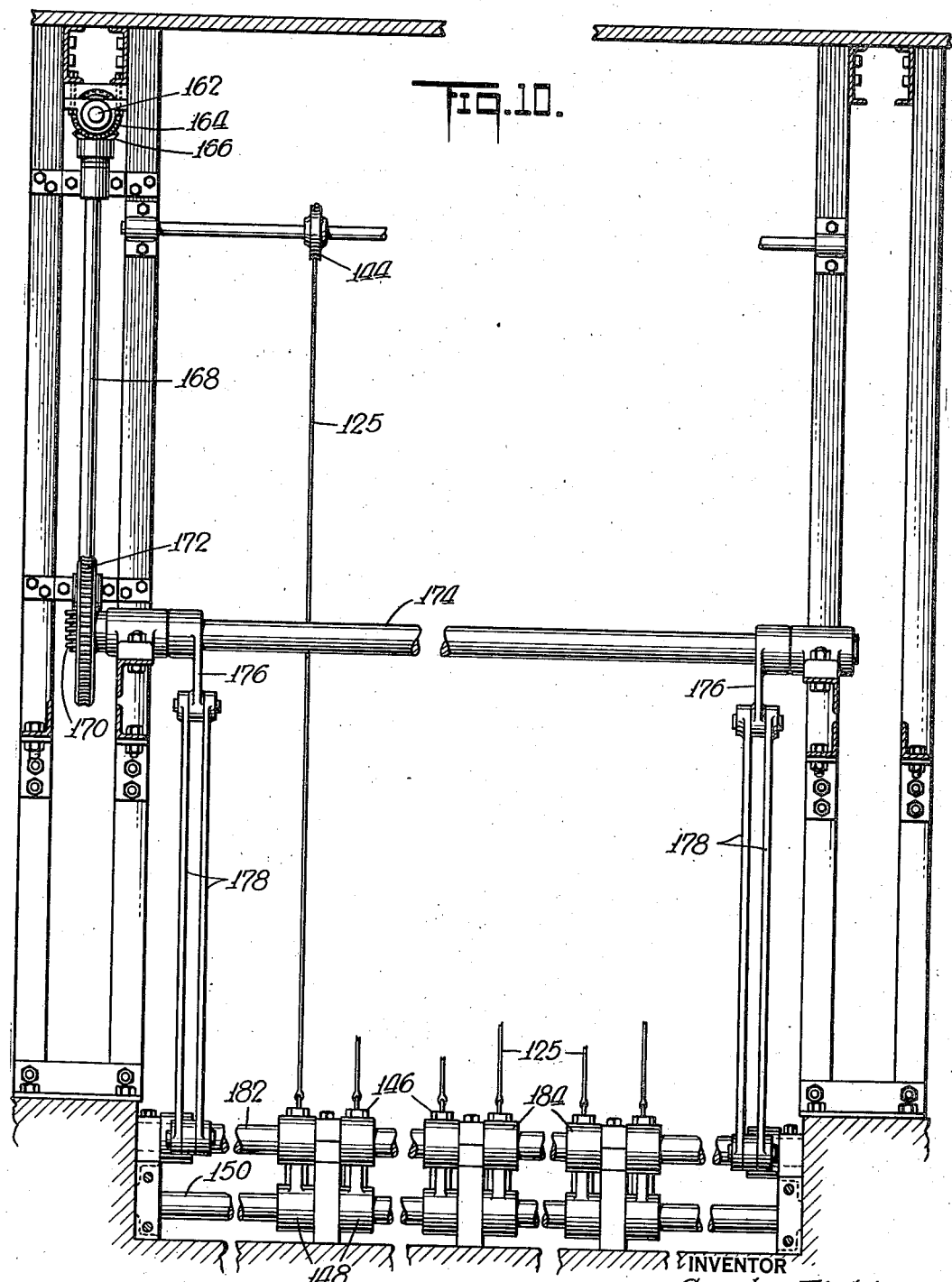

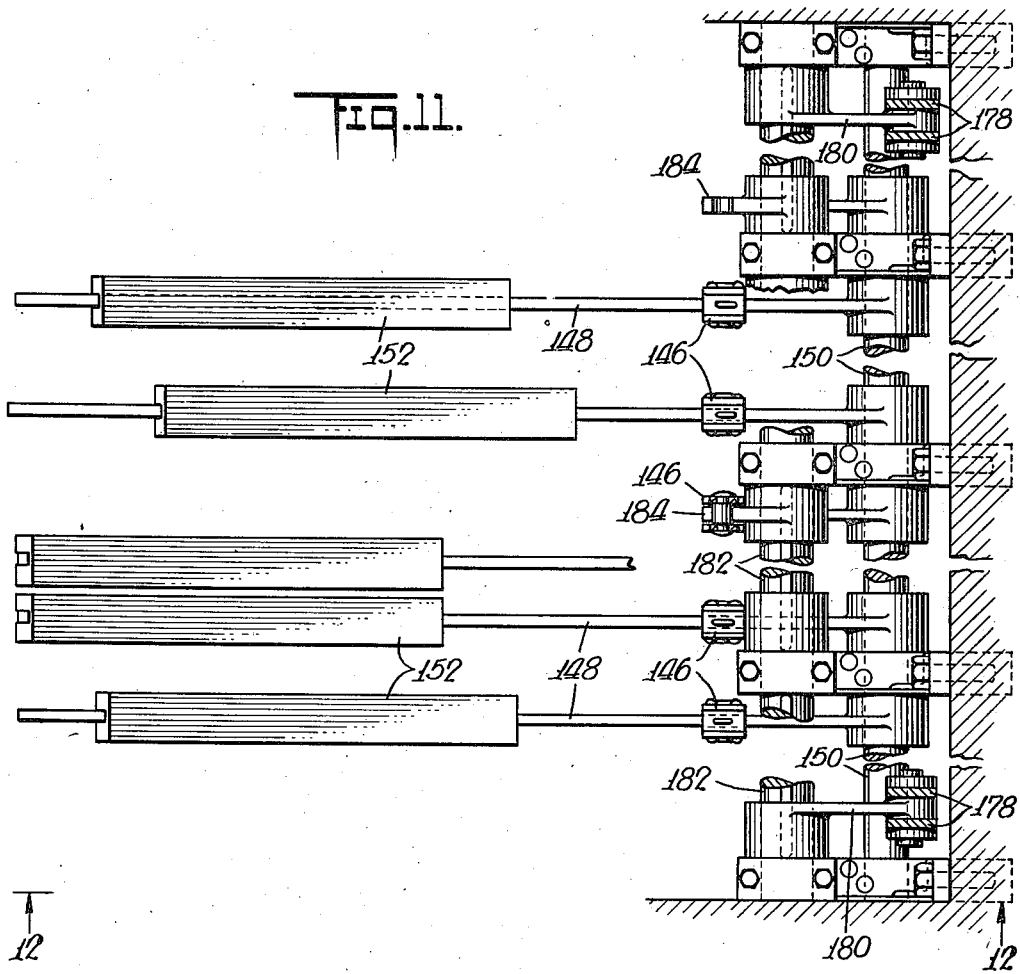
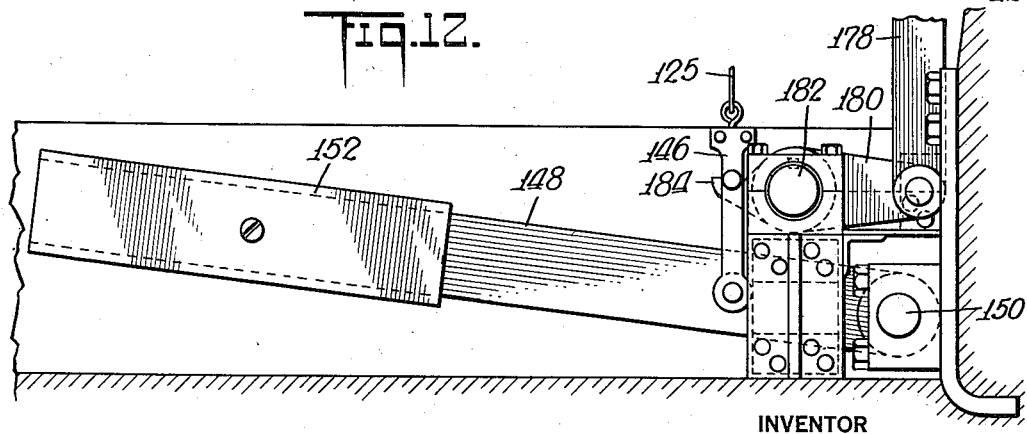

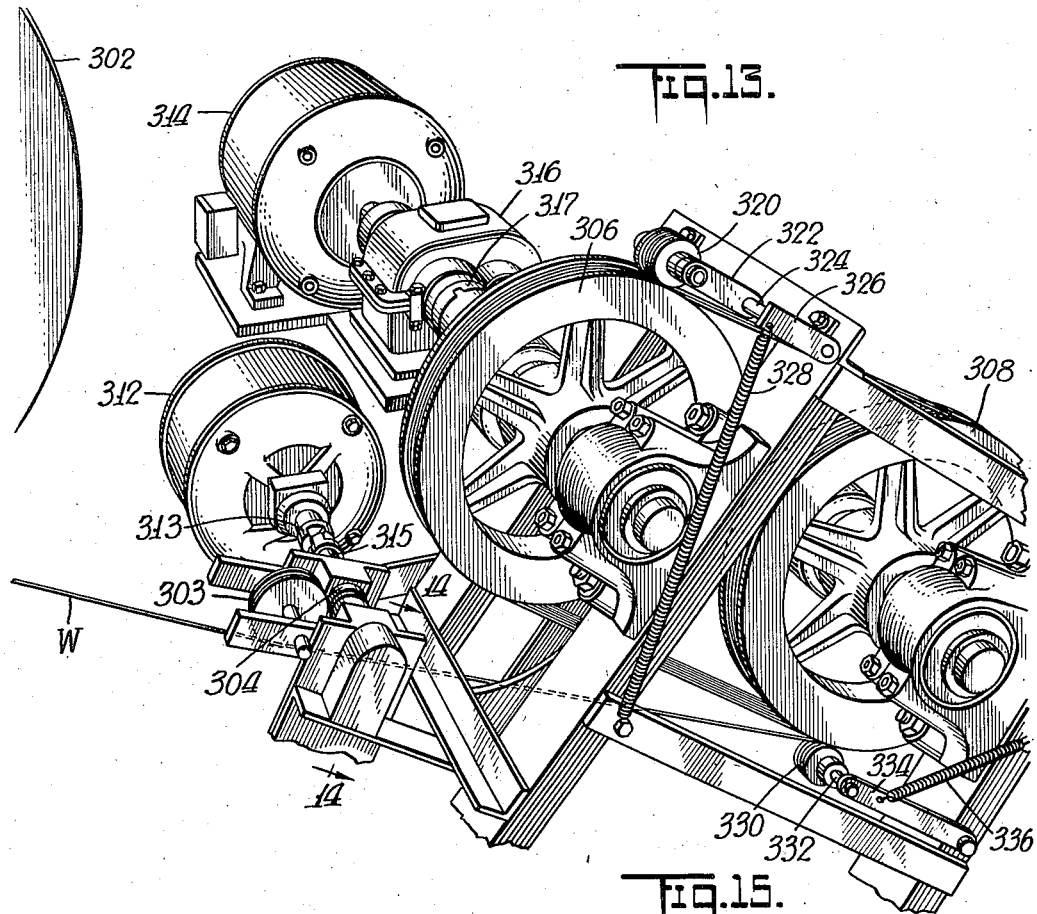
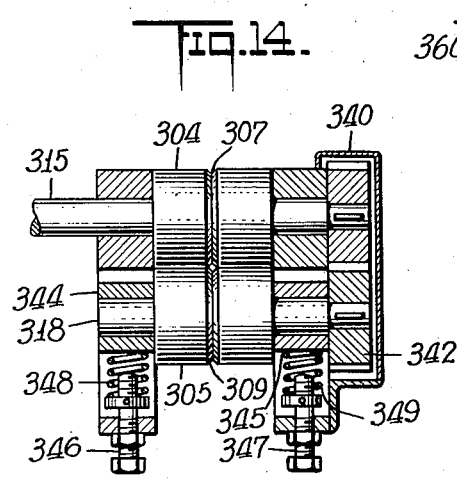
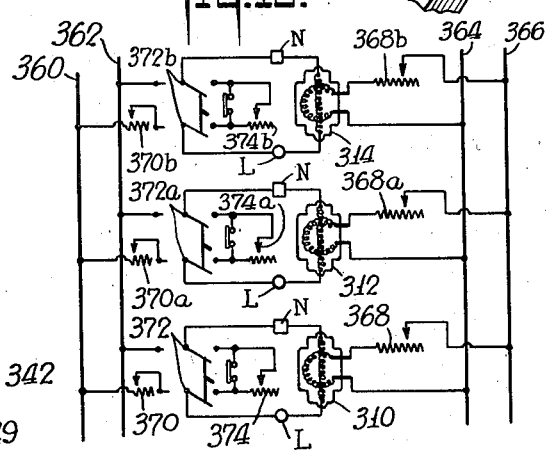

2,399,219

UNITED STATES PATENT OFFICE 2,399,219

APPARATUS FOR CUTTING METAL

Crosby Field, Brooklyn, N. Y., assignor to Brillo Manufacturing Company, Inc., Brooklyn, N. Y., a corporation of New York Application December 4, 1942, Serial No. 467,869

4 Claims. (Cl. 29—4.5)

The present invention is shown as embodied in a plant for grooving metal, preferably steel, in such manner that the metal cut from the grooves shall constitute tough, elastic, long-staple filaments or fibers, of extremely minute but relatively uniform section and presenting sharp edges. Many of the novel features of the invention involve specific adaptations for this specific purpose. It will be found, however, that certain features of the invention are applicable for cutting operations other than grooving, or for operating on metals other than steel or for purposes other than producing the specific product above described.

The specific material which I prefer to employ is steel wire or rod material of circular cross-section such as is commonly supplied in bundle coils. Many features, even very specific features, of the method are applicable to steel or other material in other forms, as, for instance, wires or rods or bands of metal that are of triangular, rectangular, polygonal or other desired cross-section. For the preferred use and for producing the preferred fibrous or wool-like material from cylindrical drawn wire or rods of bendable diameter, the invention involves close cooperative relation of many novel features and arrangements.

In the present commercial art some of the machines in general use for the above purposes consist essentially of a stationary bed over which a wire is drawn by a power-driven drum at one end of the bed. As the wire is drawn over the bed, it is guided and supported by tracks or grooves formed in the latter. A series of knives or cutters are arranged in tandem along the bed so as to be accurately adjustable and rigidly clamped with respect to the latter.

In place of the stationary bed type of apparatus, where great tension is required on the wire to overcome friction between the wire and the bed, machines of the tractor wheel type illustrated in Patents Nos. 1,608,478, 1,608,481, and 1,886,661 were developed, and these machines have taken a dominant position in the industry.

They embody a series of wire carrying, rotating, power-driven tractor wheels or drums which relieve the wire of much of its tension and which make the bed friction available for applying traction to the wire. In this arrangement the surfaces of the tractor wheels opposite each of the knives can afford all, or a large part, of the traction necessary to feed the wire against the cutting resistance of the knives. Consequently the number of knives that can be used in series all working successively on the same wire can be increased to almost any desired extent without danger of breaking the wire because there is no corresponding increase of end traction required thereupon.

In machines of the tractor wheel type the traction of the winding reel where the scrap from the machines is wound may be reduced to that required to keep the wire in close frictional engagement with the last tractor wheel bed, and this has preferably been regulated in the past by an automatic constant tension drive either through a friction clutch or a slipping belt or by electrical motors with an electrical control system such as described in Patent No. 1,608,481.

With a single large tractor wheel from twenty to sixty knives have been used and in such cases it becomes practical to have one-directional operation. An important feature in multiplying the number of knives on a given tractor wheel lay in combining the wheel with means for keeping the wire at the proper tension so that as the number of knives was increased the wire would not slip with respect to the wheel.

In tractor wheel systems in the past it has been the practice to use a relatively large number of tractor wheels, each with a limited number of knives, in reducing the wire to scrap in a single pass through the plant. It has been discovered by Crosby Field and Gerald C. Toole, however, that the number of wheels heretofore regarded as desirable may be reduced, with a consequent reduction in operating costs, by providing friction boosters in connection with each of the tractor wheels. They discovered that the commonly accepted formulae for the increase of friction with the linear amount of surface covered by a wire wrapped around a wheel did not apply for more than one turn of wire when the outer surfaces of the wire were subjected to such friction as is obtained by cutting layers off of these turns. In order, therefore, to enable the increase of the number of knives cutting, it was discovered that this lack of friction might be more than compensated for by the insertion in the system of a power-driven sheave on which no cutting was done. In order to accomplish this, mechanisms described and claimed in the copending application of Crosby Field and Gerald C. Toole, filed herewith, were developed and the sheaves of these mechanisms are referred to hereinafter as "capstans." For a complete disclosure of their operation and control reference should be made to said copending application.

The present invention incorporates various improvements in the invention of said copending application. Patents Nos. 1,608,478, 1,608,481, and 1,886,661 disclose tractor wheel type systems wherein shaving knives having bevelled and serrated edges are mounted each in floating relationship to the driven wire and each counterbalanced to maintain proper shaving engagement with the wire by means of a heavy weight located on the frame supporting the knives. The present invention eliminates these heavy, bulky and sometimes dangerous weights from the frame which supports the knives. By means of this invention each knife is individually counterbalanced through a chain system and a remotely located, adjustable weight.

The invention of said copending application enables the use of a relatively large number of knives upon a given tractor wheel and the incorporation of the structure of the copending application with the invention disclosed and claimed in this application makes practical the close spacing of a large number of knives on a given tractor wheel. By remotely locating the counterbalancing weights and by including an improved manner of adjustment, the inventions combine to give a plant more efficient than anything known to the prior art. Although these inventions combine advantageously, the various improvements thereof exist independently and obviously may be employed separately.

The instant invention also includes means whereby the various counterbalancing weights for the floating knives may be simultaneously and instantly lifted so that cutting pressure is removed from the knives, thus enabling easy adjustment to the knives or to the wire. Furthermore, the invention additionally includes a novel arrangement for supplying air blasts to the cutting knives to aid in removing the filaments of wool-like metal as they are cut.

A further important feature of the invention lies in the provision of a novel and improved feeding unit for the plant. Heretofore it has been found necessary to wind in a predetermined manner the wire that is to be fed into the plant so that it will unwind properly from the feed drum without twisting or kinking. This former method of feeding a plant has the disadvantage not only of requiring time in the preliminary winding of the feed drum but also in the fact that when the tension required to keep the wire in its proper relationship upon the tractor wheels was conveyed through the wire back to the feed drum, the tension upon the loop of wire which was being led off of the drum had a tendency to bury that loop in the underlying layers of wound wire, thus disrupting the feeding operation.

The present invention includes a novel combination between a feed drum, a pair of snubber rolls and a pair of feeding capstans, whereby the wire may be fed into the plant from a bundle, without the preliminary step of winding, or whereby it may be fed into the plant from a wound drum, as has previously been done, but with the tension of the wire going through the plant relieved from the feed drum by means of the intervening snubber rolls and feed capstans, as will be described.

In commercial use in a plant embodying the present invention and the invention aforementioned of Crosby Field and Gerald C. Toole, it has been found that the novel arrangements make possible the starting of the plant under full load, and that the plant can be continuously run under a greater rate of output with fewer operators than has heretofore been possible. The plant efficiency has further been increased because the various improvements have greatly reduced time lost through wire breakage.

It is an object of the present invention to provide a device of the character described, having to a notable extent the characteristics and capabilities above set forth. A further object is the provision of apparatus for cutting metal wool from a wire in an improved manner. An additional object is the provision in a plant for producing metal wool from a wire wrapped around tractor wheels of a remotely located counterbalancing mechanism for maintaining the proper floating relationships between knives and wire. A further object is the inclusion in a plant of the type above referred to of means whereby counterbalancing weights on the knives may be simultaneously lifted. Another object is the incorporation in such a plant of novel and improved air blast means for aiding in the removal of the filaments cut. Yet another object is the provision of a feeding mechanism whereby preliminary wire winding steps may be eliminated. Another object is the provision in a feeding mechanism for a plant of the type above referred to of means for maintaining proper tension upon the wire as it goes into the first shaving unit, while at the same time preventing increased tension on the wire as it leaves the feed drum which is supplying wire to the plant. A still further object is the provision of simplified supporting structures in shaving units of the types above referred to. Other objects will be in part pointed out as the description proceeds and will in part become apparent therefrom.

In the accompanying drawings, in which an exemplary embodiment for attaining the above objectives is set forth and in which like reference characters refer to like parts throughout the various views:

Figures 1a and 1b are in combination a schematic representation of a plant embodying the invention;

Figure 2 is a perspective view of portions of one of the shaving units schematically represented in Figures 1a and 1b;

Figure 3 is an elevational view, with parts removed, of one of the main tractor wheels represented in Figures 1a and 1b;

Figure 4 is a sectional view taken along the line 4—4 of Figure 5 in the direction of the arrows;

Figure 5 is a plan view upon an enlarged scale of two of the cutting knives and their associated parts;

Figure 6 is an elevational view of parts shown in Figure 5;

Figure 7 is a sectional view taken along the line 7—7 of Figure 2 in the direction of the arrows;

Figure 8 is an elevational edge view of one of the tractor wheels, with parts broken away, showing the supporting members and one of the knife counterbalancing weights;

Figure 9 is an elevational view, partly in section, upon an enlarged scale of part of the counterbalancing mechanism;

Figure 10 is an elevational view of the mechanism shown in Figure 9, taken from the right as seen in Figure 9;

Figure 11 is a plan view, on an enlarged scale, of a portion of the counterbalancing mechanism;

Figure 12 is an elevational view of one of the mechanisms shown in Figure 11;

Figure 13 is a perspective view of the feeding unit;

Figure 14 is a sectional view taken along the line 14—14 of Figure 13 in the direction of the arrows; and Figure 15 is a schematic representation of the electrical system used in the feeding unit shown in Figure 13.

Referring to Figures 1a and 1b, there is schematically presented the manner in which a wire to be cut into wool is led through the plant. At the left-hand side of Figure 1 a feed drum 302 carrying a coil of wire is shown. Wire, indicated by W, is led from feed drum 302 through a pair of snubber rolls 304 and 305 and is wrapped twenty times around a pair of feeding capstans 306 and 308. The feed drum is represented as mounted on the same shaft with a brake generator 310. One of the snubber rolls is mounted on the same shaft with a brake generator 312 and one of the feeding capstans is mounted on the same shaft with a brake generator 314. The feed drum, snubber rolls and feeding capstans and their associated parts comprise a feeding unit which will be described in greater detail hereinafter.

The wire, indicated by W, is led from the feeding unit to the No. 1 shaving unit, where it passes fifteen times around a tractor wheel 10 and an idler wheel 11. After thus passing around the tractor wheel and idler wheel, the wire is wrapped three times around an idler 12 and idler wheel 11, as illustrated, and then passes once around a dancer roll 13 and a dancer roll idler 14 before going to the next shaving unit. A motor 16 is illustrated on a shaft which drives tractor wheel 10. Idler 12 and dancer roll idler 14 are loosely and independently mounted for rotation about the same axis. Dancer roll 13 is carried by a dancer roll arm 15 pivotally mounted at its lower end.

The wire from shaving unit No. 1 goes to shaving unit No. 2, where it passes twenty times around a tractor wheel 20 and a capstan 21. Thereafter it passes three times around capstan 21 and an idler 22, and once around a dancer roll 23 and a dancer roll idler 24 before going to the next shaving unit. Tractor wheel 20 is indicated as driven by a motor 26 and capstan 21 is indicated as driven by a motor 27. Idler 22 and dancer roll idler 24 are loosely and independently mounted for rotation about the same axis. Dancer roll 23 is carried by a dancer roll arm 25 pivotally mounted at its lower end.

No. 3 shaving unit and No. 4 shaving unit are identical with No. 2 shaving unit, as illustrated. From No. 4 shaving unit the wire W passes beneath a wind-up idler 51 to a wind-up drum 50 driven by a motor 56. The manner, details and mechanisms by which these various shaving units may be operated and controlled are set forth in the copending application of Crosby Field and Gerald C. Toole, above mentioned.

*The shaving unit*

Figure 2 shows a perspective view of the tractor wheel, capstan and some of the associated parts of the No. 2 shaving unit. Wire W is indicated passing around wheel 20 and capstan 21. Wheel 20 is driven by means of an electric motor, not shown, and capstan 21 is driven by motor 27 through a reducing gear G. On the near side of the wheel, as viewed in Figure 2, part of a semicircular frame 102 appears. This frame is coaxially mounted with respect to wheel 20 on a supporting base 100 (see Figure 3) and includes an air duct 104 as well as an outer rim 103 which forms a support for the shaving knives indicated generally by K. The base 100 and frame 102 are shown in greater detail in Figure 3. Inlets for air duct 104 are indicated by numeral 105. Figure 3 further shows generally the manner in which the knives are mounted in brackets 112 upon studs 118 carried by frame 102.

Figure 2 illustrates filaments, indicated generally by F, which are blown away from the knives by air ducts in a manner to be described. The filaments are led by means of supports, various of which are indicated by numeral 108, to a conveying means C, comprising belts 101 which are moved in the direction indicated by the arrows to carry away the filaments. One conveyor is provided for each shaving unit and is so associated with the unit as to remove the filaments cut thereby in long continuous strands. On the far side of wheel 20, as illustrated in Figure 2, an air funnel or hood H is shown which exhausts air from the regions around the cutting knives so as to remove metal particles, dust, smoke, and the like and to aid the air ducts in leading the individual filaments away from the wire being cut. The entrance to the hood is protected by a screen, as indicated.

Figure 3 sets forth the manner in which brackets 112 are mounted on frame 102. Figures 4, 5 and 6 show an enlarged detail of this arrangement, wherein the individual blades 110 are illustrated locked in brackets 112 by means of set screws 114. Brackets 112 are mounted in bracket bearings 116. Each bracket bearing 116 is located on a tapered stud 118 between lock nuts 126 and 128 on the left, as viewed in Figure 4, and a lock nut 130 on the right. These lock nuts are so positioned that the tapered surface of bracket bearing 116 is separated from the tapered surface of stud 118 by an extremely thin film of oil, whereby the bracket bearing is freely rotatable upon and about the tapered stud. Stud 118 is threaded into an opening 119 in frame 102. Each bracket 112 is provided with a bore 136 (see Figure 4). When the knife 110 is lifted from the surface of the wire being cut by rotation about stud 118 (see also Figure 6), bore 136 comes into alignment with an opening 134 in frame 102, whereupon a lock pin 132 may be inserted through the bore and into the opening to lock the bracket and associated knife in the raised position.

Each bracket 116 carries a threaded arm 120 (see Figure 5) upon which is provided a yoke 122 adjustable through an adjustment nut 124. Each yoke 122 serves to support a chain 125 (see also Figures 2 and 3) and by varying the amount of weight on chain 125, and by adjusting the length of the lever provided on threaded arm 120 by adjustment nut 124, a control may be had over the force with which the cutting edge of knife 110 engages the wire being shaved.

Between each of the knives an air duct 106 carrying a nozzle 107 is positioned (see Figure 6) to aid in removing the filaments. An air duct 104 is cast as a part of semicircular frame 102 and ducts 106 are tapped into duct 104 in a manner to render the direction of nozzle 107 adjustable. Each nozzle 107 emits a fan-shaped blast, rather than a narrow pencil of air, so as better to cover the entire cutting area and to eliminate any need of careful adjustment.

Figure 7 is an enlarged sectional view along the line 7—7 of Figure 2 and shows the manner in which the surface of wheel 20 is grooved as at 111, to support the wire being shaved. These grooves are progressively shallower from left to right so as to maintain the adjacent cut surfaces of successive loops of the wire even with one another and to compensate for the portions of wire removed as the wire progresses from one side of the wheel to the other.

The knife counterbalancing system

Referring to Figure 8, chain 125 is indicated fixed to arm 120 of bracket 116 and proceeding downwardly about chain guides 140, 142 and 144 to a link 146 pinned to an intermediate portion of an arm 148 rotatably mounted upon a shaft 150 at its right-hand end and carrying an adjustable weight 152 upon its left-hand portion. Each knife-carrying bracket is counterbalanced by means of a chain 125. (See Figure 3.) Each chain is connected to an individual arm 148 carrying a weight 152.

Figure 9 shows the arrangement whereby the counterbalancing actions of arms 148 and weights 152 may all simultaneously be lifted from chains 125 to remove the tension thereupon. A crank 160 is shown in the upper left-hand corner of Figure 9, operable to rotate a crank shaft 162 mounted in conventional bearings. A bevel gear 164 keyed to shaft 162 meshes with a bevel gear 166 keyed to a vertically mounted shaft 168 for rotating a worm 170. Worm 170 meshes with a worm wheel 172 (see Figures 9 and 10) keyed to a crank shaft 174. Crank arms 176 operating through pitmans 178 serve to rock a cam shaft 182 by means of the crank arms 180. Cam shaft 182 carries a series of cams 184, each of which is arranged to lift upon a different link 146 and counterbalancing arm 148. Hence, operation of crank 160 serves to raise or lower cams 184, depending upon the direction of rotation, to raise the counterbalancing weights and relieve the tension in chains 125, or to lower the counterbalancing weights and restore the predetermined tensions in chains 125. Figure 9 illustrates the weights in a raised position so that rotation of crank 160 will rotate cam shaft 182 in a counterclockwise direction, as viewed in Figure 9, to lower cams 184 and to restore the tension in chains 125.

The tractor wheel 20, shown in Figure 8, is of such proportions that a normal man may walk under chain 125 where it passes from guide 142 to guide 144. The provision of the counterbalancing system below the floor line, as illustrated, removes a dangerous condition heretofore present in plants of this type. Formerly it was necessary to adjust the cutting pressure of the various knives by adjustment to a large number of individual weights hanging adjacent the periphery of the tractor wheel. These weights were subject to being dislodged, so that accurate adjustments thereto were not easily maintained and sometimes a weight would fall upon an operator. Furthermore, with the former system, the counterbalancing effect of the weights could be removed only by individual adjustments, one at a time. In the present embodiment all weights are located in an out-of-the-way position and the counterbalancing forces upon the cutting knives may all be removed, or applied, simultaneously by operation of the single crank. This not only effects a saving of time in lifting the weights from the knives, but also it provides for an immediate and simultaneous restoration of the previously adjusted tensions without the necessity of readjusting the entire unit. When the weights are lifted, the knives remain in light engagement with the surface of the wire as it is looped around the tractor wheel. This light engagement serves to maintain the wire positioned in the proper grooves, as, for example, if tension has been lost in the wire through a break, thereby preventing undue disarrangement of the wire on the wheel.

The feeding unit

Figure 13 shows a perspective view of some of the novel features of the invention as it applies to the feeding unit. The wire is shown being led from the bottom of feed drum 302, beneath a guide pulley 303, under snubber roll 304 and around feeding capstans 306 and 308. Generator 312 is shown engageable through a clutch 313 with a shaft 315 upon which snubber roll 304 is mounted. A generator 314 appears engageable through a clutch, not shown, with a reducing gear 316. Gear 316 is engageable through a clutch 317 with a shaft upon which feeding capstan 306 is mounted. A generator 310, shown in Figure 1a, is indicated as driven by the same shaft which carries feeding drum 302. In practice, a train of gears, not shown, is included in the drive between drum 302 and generator 310.

A pressure roller 320 carried by a roller arm 322 is provided to engage the surface of the wire as it passes around feeding capstan 306, to maintain proper relationship of the various loops and to eliminate crossing of the wire. Arm 322 is keyed to a shaft 324 mounted in conventional bearings and shaft 324 is provided with a spring arm 326 biased by a tension spring 328 to maintain pressure between roller 320 and feeding capstan 306. For a like purpose, pressure roller 330 is arranged on the under side of feeding capstan 308 and is held in engagement therewith by a spring 336 acting upon a spring arm 334 which carries a stud shaft 332 upon which pressure roller 330 is mounted.

Figure 14 shows a section through the snubber roll mechanism along the line 14—14 of Figure 13. Snubber roll 304 is provided with an annular groove 307 and snubber roll 305 is provided with an annular groove 309. (See Figure 14.) Roll 304 is carried upon a shaft 315 and roll 305 is carried upon a shaft 318. Shaft 315 is mounted in fixed bearings and has keyed to its right-hand end a gear 340. Shaft 318 is mounted in movable bearings 344 and 345 and has keyed to its right-hand end a gear 342. The limits within which shaft 318 is movable with respect to shaft 315 are not such as to allow gears 340 and 342 to be moved out of mesh. The wire, as it goes from the feed drum to the feeding capstans, passes through the opening formed between the snubber rolls by grooves 307 and 309 and the extent to which the wire is gripped frictionally by the snubber rolls depends upon the setting of screws 346 and 347, which load springs 348 and 349 to adjust the position of movable bearings 344 and 345.

If the plant is to be fed from a previously wound drum, such as drum 302, set screws 346 and 347 are positioned so that there is no frictional engagement between snubber rolls 304 and 305 upon the wire and guide pulley 303 serves to direct the wire from drum 302 to feeding capstans 306 and 308. With this arrangement, generator 314 is adjusted, in a manner to be described, to act as a brake upon feeding capstan 306 and to provide a considerable portion of the resistance to rotation which is necessary in order to maintain proper tension in the wire between the feeding unit and the No. 1 shaving unit.

Generator 310 on the shaft of feed drum 302 is adjusted to provide the remaining braking power required and to keep slack from accumulating between the feed drum and the feeding capstans. This relatively light tension between the feed drum and feeding capstans is not sufficient to cause the loop of wire being led from the feed drum to bury itself in the underlying layers of wound wire upon the drum.

If it is desired to feed the plant from bundle coils, rather than from a previously wound drum, snubber rolls 304 and 305 are adjusted to engage the wire between grooves 307 and 309 and generator 312 is adjusted, in a manner to be described, to act as a brake through clutch 313 and shaft 315 upon the snubber rolls. Under such conditions generator 312 and generator 314 both act as brakes upon the wire as it is being drawn into the plant by the No. 1 shaving unit. The snubber rolls serve to feed the wire from the bundle coils onto the feeding capstans and the feeding capstans, in turn, serve to supply wire properly into the plant.

*The feeding unit electrical system*

Figure 15 shows a schematic representation of the electrical circuits by which the generators of the feeding unit are controlled. The electrical systems of these generators are identical and only the system for generator 310 will be described. Corresponding parts in the system for generator 312 are indicated by the same reference numerals as used in the description of the circuits of generator 310, with the addition of an "*a*." Similarly, corresponding parts in the circuits of generator 314 are indicated by corresponding reference numerals, with the addition of a "*b*."

Current is supplied to the field of generator 310 from lines 364 and 366 under the control of a variable resistance 368. The armature of generator 310 is rotated by the wire being pulled into the plant and the current generated is connected into the leads of a double throw switch 372 which, when the generator is acting as a brake, is closed across the variable resistance 374. A normally closed contactor is indicated in parallel with resistance 374. When the plant is running, field lines 364 and 366 supply a constant direct current and this contactor is held open, but when, for any reason, power is removed from the armature circuits of the driving motors of the plant, the contactor closes to form a dead short circuit across the leads to the armature of generator 310, which short circuit multiplies the torque required to turn the armature and brings the generator to an immediate stop.

Sometimes it is desirable to run generator 310 in the reverse direction as a motor as, for example, to rewind slack after repairing a wire break, in which case double throw switch 372 is closed across armature lines 360 and 362 to supply current to the armature of generator 310 under the control of a variable resistance 370. The armature is indicated protected by an overload responsive device L and a no-load responsive device N. An overload in the circuit operates through responsive device L to trip the main switch which supplies current to all motors in the plant and to bring the plant to an immediate stop, as described in the copending application of Crosby Field and Gerald C. Toole, filed herewith. A break anywhere in the wire results in a loss of torque on the armature, whereupon no-load responsive device N serves to stop the entire plant in like manner. When the plant is being fed from a previously wound drum, generator 314 is adjusted through variable resistance 374b to effect most of the braking power upon the wire. At such times generator 312 is idle and generator 310 supplies sufficient braking power to keep slack from accumulating between the feed drum and the feeding capstans. If the plant is to be fed from bundle coils, generator 310 is idle and the braking upon the wire is effected by adjustment to the armature circuits of generators 312 and 314. Regardless of which way the plant is being fed, an overload in any armature, or a loss of torque upon any armature, serves to stop the entire plant.

The invention has been illustrated and described in the form which it takes in one plant now in operation. The embodiment illustrated and described, as pointed out above, has made the production of metal wool practical in a more compact plant than any known to the prior art, requiring fewer operators and capable of being run with a higher yield and under better control.

As many embodiments may be made of the above invention and as many changes may be made in the embodiment above set forth, it is to be understood that all matter hereinbefore set forth or shown in the accompanying drawings is to be interpreted as illustrative and not in a limiting sense.

I claim:

1. In a machine for making metal wool including a plurality of grooving knives having serrated and beveled cutting edges, and a plurality of pivotally mounted knife holders arranged one for each knife to present the serrations of the knife to the metal at acute cutting angles affording a lifting reaction on the serrations the amount of which depends upon the depth of the cut: means for applying to each knife a pivotal grooving pressure opposing such reactions yieldingly to permit balanced self-gaging action of the cutting edge thereof at a desired depth less than the depth of the serrations; said last named means including for each knife holder a pivot arm mounted thereupon, tension means for applying pivotal grooving forces through the pivot arms to the knife holders, said tension means including a plurality of tensive means each connected at one end to a pivot arm and leading away from the supporting and feeding portions of the machine to a relatively remote location and adjustable weights at said location one connected to the other end of each of said tensive means, and means for operating said tension means in unison for simultaneously removing the force of each adjustable weight from the knife holder with which it is associated.

2. The invention of claim 1 wherein the effective length of each pivot arm may be adjusted.

3. In a machine for making metal wool including a plurality of grooving knives having serrated and beveled cutting edges, and a plurality of pivotally mounted knife holders arranged one for each knife to present the serrations of the knife to the metal at acute cutting angles affording a lifting reaction on the serrations the amount of which depends upon the depth of the cut: means for applying to each knife a pivotal grooving pressure opposing such reactions yieldingly to permit balanced self-gaging action of the cutting edge thereof at a desired depth less than the depth of the serrations; said last named means including for each knife holder a pivot arm mounted thereupon and tension means for applying pivotal grooving forces through the pivot arms to the knife holders, said tension means including a plurality of tensive means each connected at one end to a pivot arm and leading away from the supporting and feeding portions of the machine to a relatively remote location and adjustable weights at said location one connected to the other end of each of said tensive means.

4. In a machine for making metal wool from wire including a large diameter tractor wheel serving as a rotating cutting bed travelling with the wire, and a plurality of closely spaced grooving knives for cutting wool from the wire, the combination including: a semi-circularly shaped stationary supporting frame coaxially arranged with respect to the tractor wheel and having its periphery lying closely along but spaced from the path traversed by the bed portions of the tractor wheel, a plurality of knife holders pivotally mounted around the periphery of said frame for holding the grooving knives and presenting the cutting edges thereof to the travelling wire with a yielding grooving pressure to cut the wool therefrom, and tension means for applying grooving pressure to said pivotally mounted knife holders; said tension means comprising a plurality of tensive means each connected at one end to a knife holder for applying pivotal movements thereto and leading away from said frame and tractor wheel to a relatively remote location, and adjustable weights at said location one connected to the other end of each of said tensive means.

CROSBY FIELD.